United States Patent [19]

Tadokoro et al.

[11] Patent Number: 4,745,753

[45] Date of Patent: May 24, 1988

[54] ENGINE TURBO-SUPERCHARGER CONTROL

[75] Inventors: Tomoo Tadokoro; Ikuo Matsuda; Masami Nakao, all of Hiroshima, Japan

[73] Assignee: Mazda Motor Corporation, Hiroshima, Japan

[21] Appl. No.: 867,540

[22] Filed: May 28, 1986

[30] Foreign Application Priority Data

| May 29, 1985 | [JP] | Japan | 60-117338 |
| May 29, 1985 | [JP] | Japan | 60-117339 |
| May 29, 1985 | [JP] | Japan | 60-117341 |

[51] Int. Cl.$^4$ .............................................. F02B 37/12
[52] U.S. Cl. ...................................................... 60/602
[58] Field of Search ................. 60/600, 601, 602, 603; 415/148, 151, 155

[56] References Cited

U.S. PATENT DOCUMENTS 4,617,799 10/1986 Tadokoro et al. .............. 415/151 X
4,633,670 1/1987 Iwasa ..................................... 60/603

FOREIGN PATENT DOCUMENTS 58-18522 3/1983 Japan ..................................... 60/602
37228 2/1984 Japan ..................................... 60/602

Primary Examiner—Michael Koczo
Attorney, Agent, or Firm—Fleit, Jacobson, Cohn & Price

[57] ABSTRACT

An engine turbo-supercharger including an exhaust gas turbine provided in the exhaust gas passage of an engine, a compressor provided in the intake passage of the engine and adapted to be driven by the turbine, a variable nozzle being provided in the exhaust gas passage upstream the turbine for changing an effective area of the exhaust gas passage leading to the turbine. The variable nozzle has a first position wherein a smaller effective passage area is provided and a second position wherein a larger effective passage area is provided, a bypass passage being provided in the exhaust gas passage and bypassing the turbine, a bypass valve for opening the bypass passage when the intake pressure of the engine increases beyond a predetermined value so that the intake pressure is maintained below the predetermined value. An engine intake gas flow detecting device is provided for detecting a physical value relating to the engine intake gas flow, a control circuit for detecting an engine operating condition wherein the engine intake pressure becomes the predetermined value when the variable nozzle is in the second position and moving the variable nozzle to the second position when the engine operating condition is detected.

17 Claims, 4 Drawing Sheets

ENGINE TURBO-SUPERCHARGER CONTROL

BACKGROUND OF THE INVENTION

The present invention relates to an engine turbo-supercharging system, and more particularly to a turbo-supercharger having an exhaust gas turbine for driving a supercharging compressor. More specifically, the present invention pertains to a turbo-supercharger wherein the exhaust gas passage for leading the exhaust gas to the exhaust gas turbine is of a variable passage area.

DESCRIPTION OF PRIOR ART

A turbo-supercharger is a system having an exhaust gas turbine which recovers the exhaust gas energy to drive a supercharging compressor, so that it is effective to increase the engine intake charge to thereby increase the engine output. The turbo-supercharger generally includes a bypass passage which bypasses the exhaust gas turbine and a bypass valve which normally closes the bypass passage but opens the passage when the supercharging pressure increases beyond a predetermined value so as to prevent the supercharging pressure from increasing excessively.

In case where the turbo-supercharger is applied to an automobile engine which is normally used in a wide speed range, a satisfactory supercharging effect is obtained only under a limited region of the speed range. More specifically, where the exhaust gas turbine is designed so that a desired supercharging effect is obtained under a high speed range wherein the quantity of the exhaust gas is relatively high, it becomes difficult to obtain a desired supercharging effect under a low speed range, because the exhaust gas flow speed under a loss engine speed decreases at the exhaust gas turbine. To the contrary, where the exhaust gas turbine is designed so that a satisfactory result is obtained under a low engine speed, an increased amount of exhaust gas must be bypassed resulting in a low of the energy contained in the exhaust gas.

In order to solve the problems in the turbo-supercharger described above, proposals have been made, for example, by Japanese laid-open patent application No. 58-18522 to divide the exhaust gas passage leading to the exhaust gas turbine into a plurality of sub-passages, for example, into a main passage and an auxiliary passage, and provide the auxiliary passage with a shut-off valve. With this structure, the shut-off valve is closed under a low speed engine operation so that the exhaust gas is passed only through the main passage. Thus, it becomes possible to increase the exhaust gas flow speed to thereby obtain a satisfactory supercharging effect. Under a high speed engine operation wherein the quantity of the exhaust gas is large, the shut-off valve is opened so that the exhaust gas is allowed to flow through both the main and auxiliary passages to thereby allow an increased quantity of exhaust gas to pass through the ezhaust gas turbine.

In the Japanese patent application, the shut-off valve in the bypass passage is controlled in accordance with the engine speed. More specifically, the shut-off valve is closed as long as the engine speed is below a predetermined value. As the engine speed increases with the shut-off valve closed and the intake pressure is increased beyond a certain value, the bypass valve is opened so that an excess amount of exhaust gas is bypassed to thereby maintain the intake pressure at a substantially constant value. As the engine speed is further increased to the forementioned predetermined value and the quantity of the bypassed exhaust gas is further increased, the shut-off valve is opened. The quantity of the bypassed exhaust gas is then abruptly decreased but the aforementioned predetermined value is chosen so that there still exists some amount of bypassed excess gas when the shut-off valve is opened. With this control, it becomes possible to avoid an abrupt change in the supercharged intake pressure when the shut-off valve is opened.

It should however be noted that the control of the shut-off valve as proposed by the Japanese patent application is disadvantageous in that the quantity of the bypass gas increases to a substantial value before the shut-off valve is opened so that the engine output is gradually decreased as the engine speed increases. As the result, when the engine speed reaches the aforementioned predetermined value and the shut-off valve is opened, there is produced an abrupt increase in the engine output so that a so-called torque shock is produced.

It should further be noted that the control of the shut-off valve only by the engine speed is not advisable because the rate of increase in the supercharged intake pressure is dependent on the opening of the engine throttle valve. Therefore, under an engine operation with a small throttle valve opening, there will be a possibility that the intake pressure decreases to a value wherein the bypass valve is closed when the shut-off valve is opened. Thus, there will be produced as abrupt change in the engine output torque.

SUMMARY OF THE INVENTION

It is therefore an object of the present invention to provide an engine turbo-supercharger having control valve means for changing the effective area of the exhaust gas passage leading to the exhaust gas turbine and control means for controlling the control valve means so that the opening and closing of the control valve means are effected at timings wherein an abrupt change in the engine output torque is avoided.

A further object of the present invention is to provide an engine turbo-supercharger control system wherein the effective area of the exhaust gas passage leading to the exhaust gas turbine is changed at an appropriate timing so that an abrupt change in the engine output torque is avoided.

According to the present invention, the above and other objects can be accomplished by an engine turbo-supercharger including exhaust gas turbine means provided in exhaust gas passage means of an engine, compressor means provided in intake passage means of said engine and adapted to be driven by said turbine means, variable nozzle means provided in said exhaust gas passage means upstream the turbine means for changing an effective area of the exhaust gas passage means leading to said turbine means, said variable nozzle means having a first position wherein a smaller effective passage area is provided and a second position wherein a larger effective passage area is provided, bypass passage means provided in said exhaust gas passage means and bypassing said turbine means, bypass valve means for opening said bypass passage means when the intake pressure of said engine increases beyond a predetermined value so that the intake pressure is maintained below the predetermined value, CHARACTERIZED BY engine intake gas flow detecting means for detecting a physical value relating to the engine intake gas flow, control means for discriminating an engine operating condition wherein the engine intake pressure becomes said predetermined value when said variable nozzle means is in the second position and moving said variable nozzle means to said second position when said engine operating condition is detected.

According to the aforementioned features of the present invention, it is possible to avoid an abrupt change in the engine output torque when the shut-off valve means is opened. When the shut-off valve is opened earlier than this timing, the supercharged intake pressure becomes lower than the predetermined value when the shut-off valve means is opened. Therefore, there will be produced an abrupt change in the engine output torque. If the shut-off valve means is opened later than this timing, the engine output is started to decrease before the shut-off valve means is opened due to an increase in the exhaust gas pressure and the engine output is suddenly increased when the shut-off valve means is opened due to a decrease in the exhaust gas pressure.

According to another feature of the present invention, there is provided an engine turbo-supercharger including exhaust gas turbine means provided in engine exhaust gas passage means, compressor means provided in engine intake passage means and adapted to be driven by said turbine means, said exhaust gas passage means being divided into a plurality of passages which are leading to said turbine means, at least one of said passages being provided with shut-off valve means, means for providing a control line which divides the engine operating range into a high speed, high load region and a low speed, light load region and closing said shut-off valve means when the engine operating condition is in said low speed, light load region and opening said shut-off valve means when the engine operating condition is in said high speed, high load region, CHARACTERIZED BY THE FACT THAT said shut-off valve means includes valve member means arranged for movement between a closed position wherein it closes said one passage and an open position wherein it is moved against an exhaust gas flow in said exhaust gas passage means away from said one passage, control means being provided for opening said shut-off valve means even under said low speed, light load region when the engine speed is above a predetermined value.

The above and other object and features of the present invention will become apparent from the following descriptions taking reference to the accompanying drawings.

DESCRIPTION OF THE PREFERRED EMBODIMENT

Figure 1:
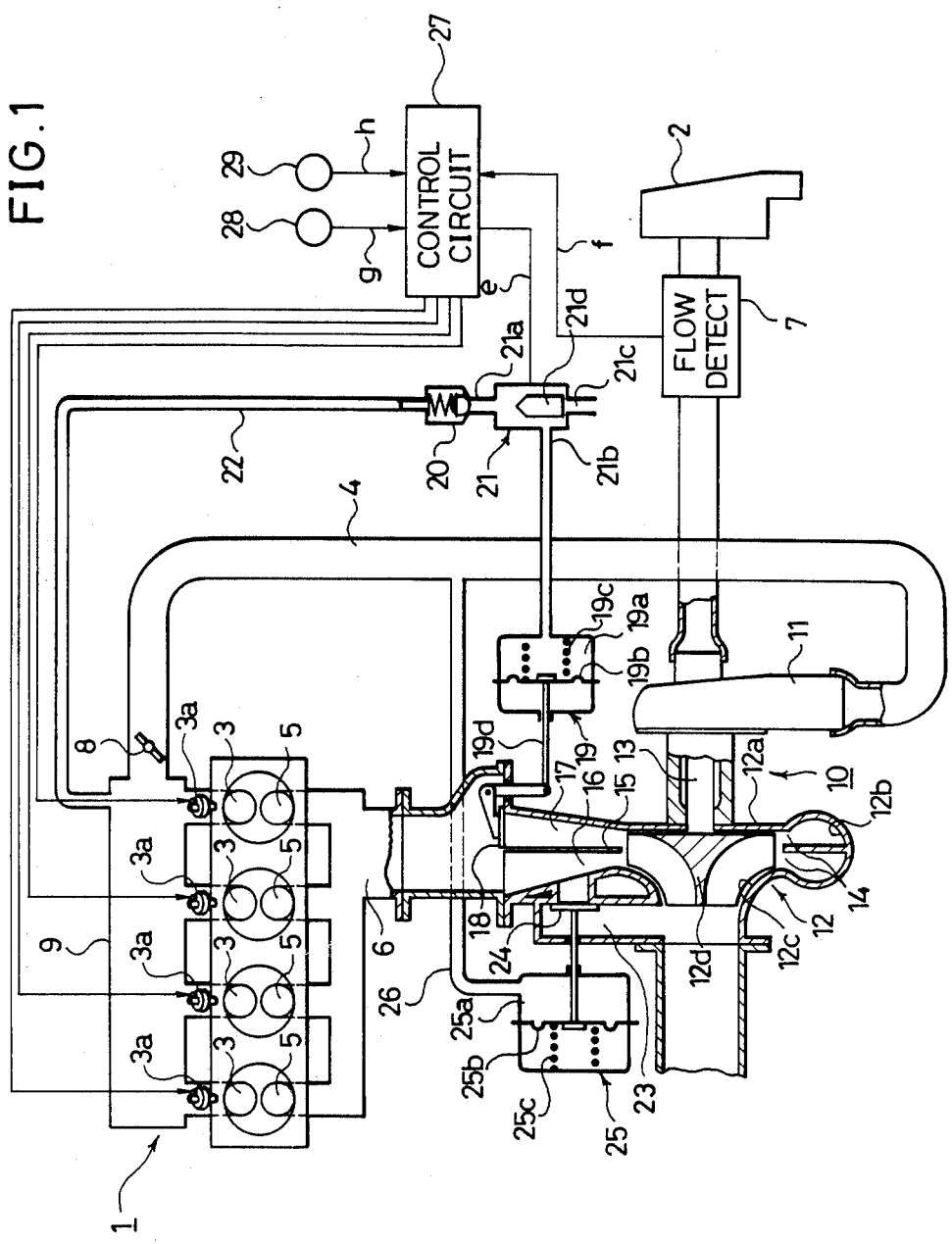
FIG. 1 is a schematic drawing showing an engine supercharging system in accordance with one embodiment of the present invention.

Referring to the drawings, particularly to FIG. 1, there is shown an engine 1 having an intake passage for introducing the intake air through an air-cleaner 2 and intake ports 3 into combustion chambers. The engine further includes an exhaust passage 6 which leads combustion gas in the combustion chamber from exhaust ports 5 to the atmosphere. In the intake passage 4, there are provided an intake air flow detector 7 which may be of any known type for detecting the quantity of the intake air flow, and a throttle valve 8 located downstream the air flow detector 7. Downstream the throttle valve 8, the intake passage 4 is formed with a surge tank 9 which is connected with respective ones of the combustion chambers. In the intake ports 3, there are provided fuel injection valves 3a. It should further be noted that the exhaust passage 6 is provided with an exhaust gas purifier and an exhaust noise attenuator as is well known in the art, although not shown in the drawing.

The engine 1 further has an exhaust gas turbo-supercharger 10 which is provided between the intake passage 4 and the exhaust passage 6. The supercharger 10 includes a compressor or blower 11 located in the intake passage 4 and an exhaust gas turbine 12 located in the exhaust passage 6. The blower 11 and the turbine 12 are connected with each other by means of a turbine shaft 13. The turbine 12 is driven by the exhaust gas passing through the exhaust passage 6 and the rotation of the turbine 12 is transmitted through the shaft 13 to the blower 11, so that the blower 11 is rotated to compress the intake air.

The turbine 12 of the supercharger 10 includes a turbine casing 12a formed with a turbine scroll 12b and a rotor chamber 12c wherein a turbine rotor 12d is rotatably supported. The turbine scroll 12b is divided into two passages which open to the rotor chamber 12c through nozzles 14. The divided passages in the turbine scroll 12b are communicated with the exhaust passage 6 through a main passage 16 and an auxiliary passage 17 which are separated by a partition wall 15. At the upstream end of the auxiliary passage 17, there is a shut-off valve 18 which closes the passage 17. The shut-off valve 18 is swingably supported so that it is movable from the closed position shown in FIG. 1 toward upstream side to open the passage 17. For moving the shut-off valve 18 between the closed and open positions, there is provided an actuator 19.

As shown in FIG. 1, the actuator 19 includes a pressure chamber 19a which is defined by a pressure-sensitive diaphragm 19b. The surge tank 9 is connected with the pressure chamber 19a of the actuator 19 through a conduit 22 having a one-way valve 20 and a control valve 21 so that a negative air pressure is created in the pressure chamber 19a. When the intake pressure is negative, the diaphragm 19b is moved in a direction which decreases the volume of the pressure chamber 19a. In the pressure chamber 19a, there is provided a spring 19c which forces the diaphragm 19b against the negative pressure in the chamber 19a. The diaphragm 19b is connected through a rod 19d with the shut-off valve 18. It will therefore be understood that, when the negative pressure is introduced into the pressure chamber 19a, the diaphragm 19b is moved under the negative pressure toward right in FIG. 1 to force the shut-off valve 18 to the closed position.

The control valve 21 includes an inlet port 21a which is connected through the one-way valve 20 with the surge tank 9, an outlet port 21b connected with the pressure chamber 19a of the actuator 19 and an atmospheric pressure port 21c which is opened to the atmosphere. The control valve 21 further has a valve member 21d which is adapted to connect the port 21b alternately with the port 21a or the port 21c. When the valve member 21d is in the on position wherein the port 21b is connected to the port 21a, the pressure in the surge tank 9 is introduced into the pressure chamber 19a; however, when the valve member 21d is in the position off wherein the port 21b is opened to the port 21c, the atmospheric pressure is introduced into the pressure chamber 19a, so that diaphragm 19b is moved toward left in FIG. 1 to move the shut-off valve 18 to the open position. The one-way valve 20 functions to prevent a positive pressure from being transmitted to the pressure chamber 19b. It will therefore be understood that when the engine intake pressure is of a positive value and the valve member 21d is still in the position of connecting the port 21b with the port 21a, a negative pressure is entrapped in the pressure chamber 19a to maintain the shut-off valve in the closed position.

In FIG. 1, it will further be noted that turbine casing 12a is formed with a bypass passage 23 which opens the main passage 16 directly to the atmosphere bypassing the turbine 12. At the inlet port of the bypass passage 23, there is provided a bypass valve 24 which is operated by an actuator 25 to move between a closed position and an open position. The actuator 25 includes a pressure-sensitive diaphragm 25b which defines a pressure chamber 25a. Further, the diaphragm 25b is connected with the valve 24. The pressure chamber 25a is connected through a conduit 26 with the intake passage 4 so that the intake pressure is introduced into the chamber 25a. When the engine intake pressure is of a negative value, the diaphragm 25b is drawn in the direction of closing the valve 24. A spring 25c is provided to force the diaphragm 25b in the direction of closing the valve 24. When the intake pressure increases beyond a predetermined value, the diaphragm 25b is moved against the force of the spring 25c to open the valve 24. With the function of the bypass valve 24, it becomes possible to maintain the maximum value of the intake pressure at the predetermined value.

In order to operate the control valve 21, there is provided a control circuit 27 which applies a control signal to the control valve 21 to move the valve member 21d to one of the two positions previously mentioned. The control circuit 27 receives an intake air flow signal f from the detector 7. Further, the control circuit 27 receives signals g and h from an engine speed detector 28 and an acceleration detector 29 and produces a control signal e which is applied to the control valve 21.

Figure 2:
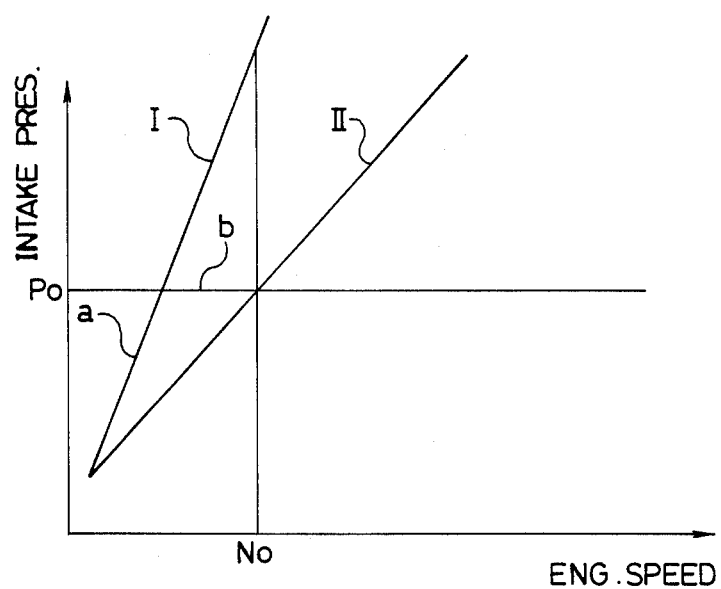
FIG. 2 is a diagram showing the relationship between the supercharged intake pressure and the engine speed.

In operation, when the engine is in the low speed region so that the supercharged intake pressure is below a predetermined value Po as shown in FIG. 2, both the shut-off valve 18 and the bypass valve 24 are closed. As the engine speed increases, the intake pressure is increased along a line I as shown by a in FIG. 2 until the intake pressure reaches the value Po. When the intake pressure reaches the value Po, the bypass valve 24 is opened so that a part of the exhaust gas is passed through the bypass passage 23. Thus, the intake pressure is maintained substantially constant as shown by b in FIG. 2.

As the engine speed increases, the intake air flow increases and, when the intake air flow reaches a value Qo, the control circuit 27 produces the control signal e which is applied to the control valve 21. Thus, the atmospheric pressure is introduced into the pressure chamber 19a of the actuator 19 so that the shut-off valve 18 is moved to the open position. The value Qo at which the shut-off valve is opened is determined so that the valve 18 is opened at a timing wherein the intake pressure reaches the aforementioned predetermined value Po. For example, where the throttle valve 8 is in the full open position, the value Qo of the intake air flow corresponds substantially to the engine speed No in FIG. 2 where the line II intersects the predetermined pressure line Po. By opening the shut-off valve 18 substantially at the intake air flow Qo, it is possible to maintain the engine output torque substantially equal before and after the opening of the shut-off valve. If the shut-off valve 18 is opened before the intake air flow increases to the value Qo, the supercharged intake air pressure decreases below the value Po, so that there will be a decrease in the engine output torque. If the shut-off valve is opened after the intake air flow is increased above the value Qo, there will be a sudden increase in the engine output torque since the exhaust gas pressure is at an increased value as will be noted in FIG. 5 and there will be a sudden decrease in the exhaust gas pressure when the shut-off valve is opened.

Figure 3:
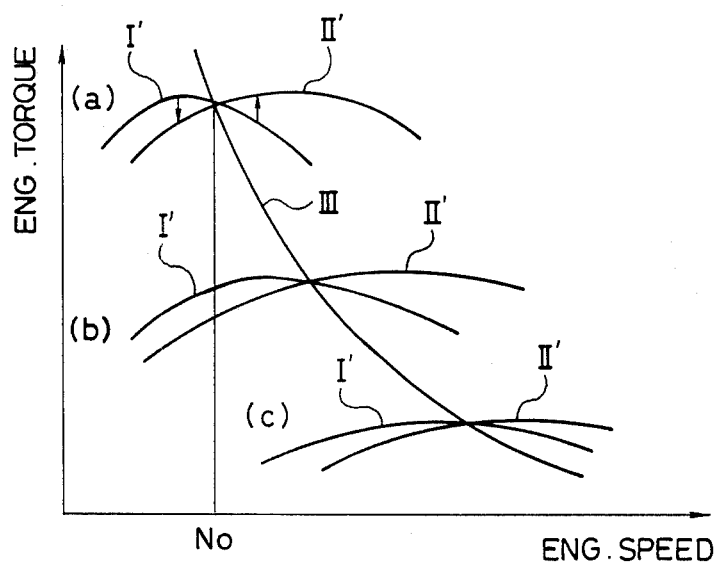
FIG. 3 is a diagram showing the relationship between the engine output torque and the engine speed.

Referring to FIG. 3, it will be noted that when the shut-off valve is closed, the engine output torque changes as shown by the torque curves I', whereas when the shut-off valve 18 is opened, the engine output torque changes as shown by the torque curves II'. The curves a show the engine output torque changes when the engine throttle valve is fully opened. The curves b show the engine output torque changes when the engine throttle valve is in the medium opening position, whereas the curves c show the engine output torque changes when the engine throttle valve is in minimum opening position. It will be noted that, when the engine throttle valve is fully open, the curves I' and II' intersect at the engine speed No where the intake air flow is Qo. Therefore, if the shut-off valve 18 is opened at an engine speed lower than No, there will be a decrease in the engine output torque as shown by an arrow in FIG. 3. Further, if the shut-off valve 18 is opened at an engine speed higher than the value No, there will be an increase in the engine output torque as shown by an arrow in FIG. 3. It will therefore be understood that it is recommendable to open the shut-off valve 18 substantially at the engine speed No where the intake air flow is Qo.

It should be noted that the position where the torque curves I' and II' intersect is independent from the engine speed but is determined by the quantity of the exhaust gas which flows through the exhaust gas turbine which is substantially proportional to the intake air flow. Therefore, the torque curves I' and II' intersect whenever the intake air flow is at a predetermined value irrespective of the engine operating condition. As shown in FIG. 3, the point of intersection between the torque curves I' and II' moves along a curve III, so that the curves I' and II intersect at a higher engine speed under lower engine output torque. Thus, it is recommendable to open the shut-off valve 18 when the engine operating condition crosses the curve III shown in FIG. 3. The control is advisable because it becomes possible to obtain an increased engine output in a wide engine operating range without producing a torque shock when the shut-off valve 18 is opened.

As described, it is recommendable to open the shut-off valve 18 when the engine operating condition crosses the curve which represents the engine operating condition wherein the intake air flow is at a predetermined value Qo which corresponds to the engine intake pressure wherein the bypass valve 24 starts to open when the shut-off valve 18 is opened. It should however be noted that in actual practice there will be a certain delay in opening movement of the shut-off valve 18, so that there may be set up a control line which is shifted slightly toward a low intake air flow side from the line representing the quantity Qo.

Figure 4:
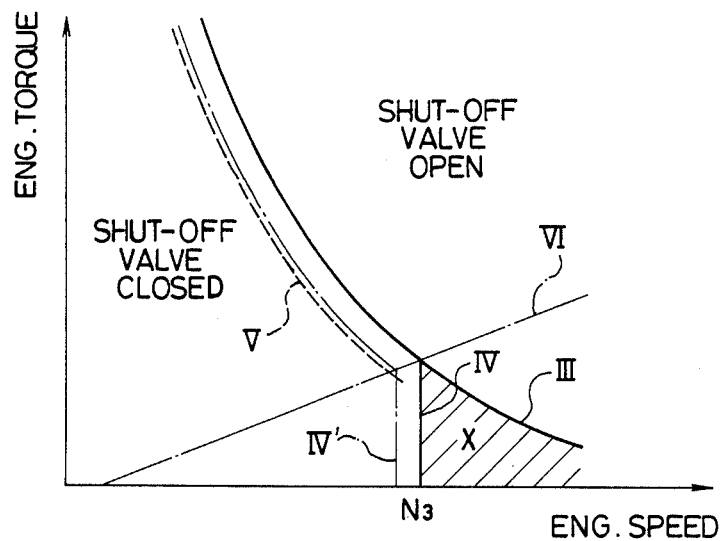
FIG. 4 is a diagram showing the control region in terms of the engine output torque and the engine speed.
Figure 5:
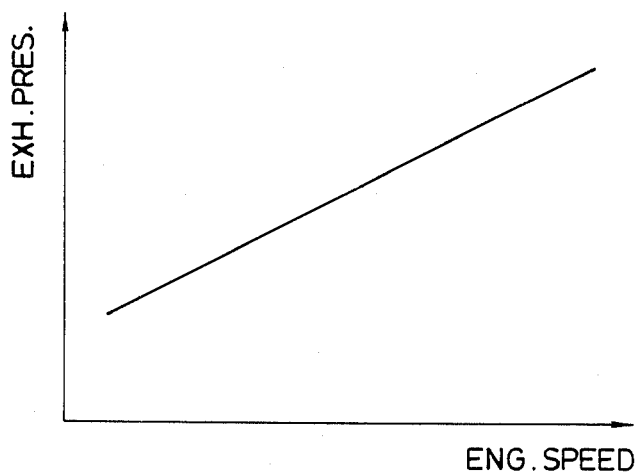
FIG. 5 is a diagram showing the relationship between the exhaust gas pressure and the engine speed; and, FIG. 6 is a program flow chart showing one example of the control in the present invention.

In the illustrated embodiment, the shut-off valve 18 is structured so that it is opened against the exhaust gas flow in the exhaust passage 6. Further, the exhaust gas pressure increases as the engine speed increases as shown in FIG. 5. It is therefore possible in a light load, high speed range as shown by a shadowed area X in FIG. 4 that the exhaust gas pressure is so high that the shut-off valve 18 cannot be opened against the exhaust gas flow. These light load, high speed range is a condition wherein a high intake pressure is not required because such condition usually occurs in deceleration. In the illustrated embodiment, the control circuit 27 therefore produces a control signal e under the engine speed N3 even when the engine operating condition is in the lower intake air flow side than the line III representing the intake air flow Qo. It is preferable to determine the engine speed N3 as a speed at which the line III intersects a line VI which represents a normal engine operating condition wherein the engine is neither in acceleration nor in deceleration. The control line is shown in FIG. 4 by a character IV.

In order to prevent hunting, it is also advisable to provide a hysterisis in controlling the shut-off valve 18. For the purpose, control lines V and IV' are provided as shown in FIG. 4. Those lines are shifted from the lines III and IV toward the low speed side and the shut-off valve 18 is opened when the engine speed increases across the control lines III and IV but closed when the engine speed decreases across the control lines V and IV'. It may be possible that the opening of the shut-off valve 18 will be delayed due to the pressure of the exhaust gas under a rapid acceleration. If such condition occurs, there may be produced a sudden decrease in the engine output torque when the shut-off valve 18 is opened. In order to avoid such a problem, the control circuit 27 receives the rapid acceleration signal h from the detector 29 and functions to shift the shut-off valve opening lines III and IV toward the low speed side to, for example, the position of the lines V and IV'.

In the above descriptions, the control is carried out under the intake air flow signal from the detector 7; however, an exhaust gas flow quantity signal or a signal representing the exhaust gas pressure downstream the turbine 12 may be used in lieu of the intake air flow signal. Further, a control map may be provided based on the engine load, such as the throttle valve position, and the engine speed and the shut-off valve 18 may be controlled in the region substantially corresponding to the line representing the intake air flow Qo.

Figure 6:
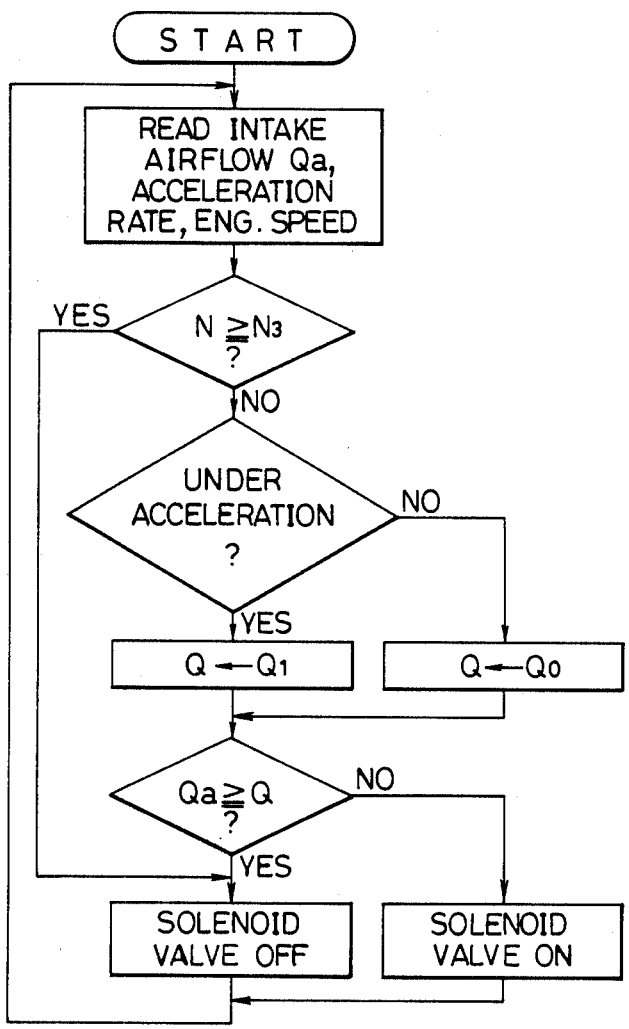

An example of the control in accordance with the present invention is shown in the program flow chart is FIG. 6.

As should be apparent from this figure, the intake air flow Qa, the acceleration rate and the engine speed are first read and a judgment is then made as to whether the engine speed N is greater than the value N3 which is shown in FIG. 4. If the engine speed N is greater than N3, the control (solenoid) valve 21 is maintained in an OFF position so that the valve 18 is opened to the atmosphere. When the engine speed is not greater than the value N3, a further judgment is made as to whether the engine 1 is under an acceleration. If the engine is under an acceleration, a value Q1 is used for the reference value Q, which is compared with the intake air flow Qa. In a case where the intake air flow Qa is greater than the reference value Q, the control valve 21 is held in the OFF position to open the valve 18. If the intake air flow Qa is not greater than the reference value Q, the control valve 21 is moved to the ON position to close the valve 18. When the engine is not under acceleration, a value Qo which is smaller than the value Q1 is used for the reference value Q and the same procedure is repeated.

The invention has thus been shown and described with refence to a specific embodiment, however, it should be noted that the invention is in no way limited to the details of the described arrangements but changes and modifications may be made without departing from the scope of the appended claims.

What is claimed:

1. An engine turbo-supercharger including exhaust gas turbine means provided in exhaust gas passage means of an engine, compressor means provided in intake passage means of said engine and adapted to be driven by said turbine means, variable nozzle means provided in said exhaust gas passage means upstream the turbine means for changing an effective area of the exhaust gas passage means leading to said turbine means, said variable nozzle means having a first position wherein a smaller effective passage area is provided and a second position wherein a larger effective passage area is provided, bypass passage means provided in said exhaust gas passage means and bypassing said turbine means, bypass valve means for opening said bypass passage means when the intake pressure of said engine increases beyond a predetermined value so that the intake pressure is maintained below the predetermined value, characterized by control means for detecting an engine operating condition wherein the engine intake pressure becomes said predetermined value when said variable nozzle means is in the first position and moving said variable nozzle means to said second position when said engine operating condition is detected.

2. An engine turbo-supercharger in accordance with claim 1 in which said control means includes means for moving said variable nozzle means to said second position when the intake gas flow is increased and reaches a first predetermined value under said engine operating condition and moving said variable nozzle means to said first position when said intake gas flow is decreased and reaches a second predetermined value which is smaller than said first predetermined value.

3. An engine turbo-supercharger in accordance with claim 1 in which said control means includes means for moving said variable nozzle means to said second position when the intake gas flow is increased and reaches a first predetermined value under said engine operating condition, and for detecting an engine rapid acceleration and moving said variable nozzle means to said first position when the rapid acceleration is detected and the intake gas flow is increased to a second predetermined value when is smaller than said first predetermined value.

4. An engine turbo-supercharger in accordance with claim 1 in which means is provided for moving said variable nozzle means to said second position when the intake gas flow is increased and reached to a second predetermined value which is smaller than said predetermined value.

5. An engine turbo-supercharger in accordance with claim 4 in which said control means further includes means for moving said variable nozzle means to said first position when said intake gas flow is decreased and reached to a second predetermined value which is smaller than said first mentioned predetermined value.

6. An engine turbo-supercharger in accordance with claim 1 in which said variable nozzle means includes a plurality of passages which are provided in said exhaust passage means upstream said turbine and separated from each other and shut-off valve means is provided in at least one of said passages.

7. An engine turbo-supercharger in accordance with claim 6 in which means is provided for moving said variable nozzle means ot said second position when the intake gas flow is increased and reached to a second predetermined value which is smaller than said predetermined value.

8. An engine turbo-supercharger in accordance with claim 2 in which said control means further includes means for moving said variable nozzle means to said first position when said intake gas flow is decreased and reached to a second predetermined value which is smaller than said first mentioned predetermined value.

9. An engine turbo-supercharger in accordance with claim 8 in which said shut-off valve means includes a valve member which is adapted to be moved from a closed position to an open position against an exhaust gas stream in said exhaust passage means.

10. An engine turbo-supercharger in accordance with claim 7 in which said shut-off valve means includes a valve member which is adapted to be moved from a closed position to an open position against an exhaust gas stream in said exhaust passage means.

11. An engine turbo-supercharger in accordance with claim 10 in which said control means includes means for moving said shut-off valve means to said second position under an engine speed higher than a predetermined value.

12. An engine turbo-supercharger comprising turbine means provided in engine exhaust passage means, compressor means provided in engine intake passage means and adapted to be driven by said turbine means, said exhaust passage means including a plurality of passages leading to said turbine means, shut-off valve means provided in at least one of said passages, bypass passage means provided in said exhaust passage means and bypassing said turbine means, waste gate valve means provided in said bypass passage means and adapted to be opened at a predetermined value of engine intake pressure to maintain the maximum value of said intake pressure to said predetermined value, characterized by means for detecting a specific engine operating condition wherein at least under a high output engine operation the engine output torque with said shut-off valve means closed becomes substantially equal to the engine output torque with said shut-off valve means open, and control means for moving said shut-off valve means when said specific engine operating condition is reached.

13. An engine turbo-supercharger in accordance with claim 12 in which said specific engine operating condition is a condition wherein the intake pressure reaches said predetermined value with said shut-off valve closed.

14. An engine turbo-supercharger in accordance with claim 12 in which said specific engine operating condition is a condition wherein engine intake air flow is substantially constant.

15. An engine turbo-supercharger in accordance with claim 12 in which said engine operating condition detecting means is means for detecting engine intake air flow.

16. An engine turbo-supercharger in accordance with claim 12 in which said shut-off valve means includes a valve member which is adapted to be moved from a closed position to an open position against an exhaust gas stream in said exhaust passage means.

17. An engine turbo-supercharger in accordance with claim 16 in which said control means includes means for moving said shut-off valve means to said open position under an engine speed higher than a predetermined value.

* * * * *